United States Patent [19]

Fjeldsted et al.

[11] Patent Number: 4,502,751

[45] Date of Patent: Mar. 5, 1985

[54] LINEAR OPTICAL SCANNER

[75] Inventors: Thomas P. Fjeldsted, West Covina; Alson E. Hatheway, Pasadena, both of Calif.

[73] Assignee: Rockwell International Corporation, El Segundo, Calif.

[21] Appl. No.: 466,682

[22] Filed: Feb. 15, 1983

[51] Int. Cl.³ .............................................. G02B 27/17
[52] U.S. Cl. ....................................................... 350/6.4
[58] Field of Search ........................................ 350/6.4

[56] References Cited

U.S. PATENT DOCUMENTS 3,226,721 12/1965 Gould .................................. 350/6.4

Primary Examiner—John K. Corbin
Assistant Examiner—Rebecca D. Gass
Attorney, Agent, or Firm—H. Frederick Hamann; James F. Kirk

[57] ABSTRACT

A linear optical scanner adapted to receive light rays from object space, the light rays passing through the linear optical scanner in image forming relation, the linear optical scanner being adapted to periodically and reciprocally deflect the collimated light rays through a predetermined angle. The periodically and reciprocally deflected collimated light rays leave the linear optical scanner and passing through an objective lens system to an image plane. The objective lens system has an optical axis incident on the image plane and is adapted to focus the periodically and reciprocally deflected collimated light rays to form a periodically and reciprocally displaced image on the image plane. The linear optical scanner comprises: a first and second wedge prism, each wedge prism having: a first surface, an optical axis, and a second surface, each respective optical axis passing through a respective first and second surface, a pivot axis, means for pivoting each respective wedge prism on a respective pivot axis and for positioning each respective wedge prism optical axis to direct the collimated light rays passing through the linear optical scanner to the objective lens system, and means for periodically and reciprocally counter-rotating each respective wedge prism through a predetermined angle on each respective pivot axis. The wedge prisms have prescriptions adapted to produce reciprocal lateral displacement of the collimated light rays; whereby, the linear optical scanner and the objective lens cooperate to produce a focused image on the focal plane. The focused image is periodically, reciprocally and laterally displaced on the focal plane.

24 Claims, 5 Drawing Figures

LINEAR OPTICAL SCANNER

The invention herein described was made in the course of or under a contract or subcontract thereunder, with the Department of the Army.

BACKGROUND OF THE INVENTION

1. Field of the Invention

This invention relates to lens systems for projecting an image onto a focal plane and more particularly to the field of scanners for periodically and reciprocally translating the image on the image plane between a first and second limit position. The invention scanner is particularly adapted for use in light weight portion FLIR (Forward Looking Infrared) surveillance systems and is typically employed with an objective lens system for scanning an image on a sensitive image plane.

2. Description of the Prior Art

Various optical scanner devices are shown in the art for deflecting or scanning a beam of light on an image plane or sensitive focal plane. These devices range from a simple mirror or refractive element rotating about an axis perpendicular to the optical axis of the system to other more sophisticated systems including those using counter-rotating wedges as described in the "Fundamentals of Optics" by Jenkins and White, McGraw-Hill, 1957, pages 23 and 24. The counter-rotating wedge scanner is widely accepted in the optics field for applications requiring precise control of angle of deflection and beam control. Another suggested wedge-prism optical scanner is described in U.S. Pat. No. 3,881,802, issued May 6, 1975, to U. V. Helava and describing a wedge-prism scanner embodying only one rotating wedge.

One problem associated with scanners known in the art is that they translate the image on the image plane with a sinusoidal velocity on the image plane. Another problem associated with the counter-rotating wedge beam scanner is that the wedges must be rotated in opposite direction with perfectly matched angular velocities. Variations in the respective angular velocities of each of the respective prisms will result in a deflection error producing an orbital or elliptical motion of the image on the image plane.

Another problem typically associated with counter-rotating wedge beam scanners is the requirement for precision in manufacture of the respective rotating wedges for those applications requiring relatively constant image velocity on the image plane. Another and most important problem typically associated with the counter-rotating wedge scanner when used to scan an image on an image plane with relatively constant image velocity on the image plane is low optical scan efficiency. The low scan efficiency results from the fact that the image translates on the image plane with a velocity relative to the image plane varying as a sinusoidal function. To obtain a relative linear velocity, the application must restrict the usable range of the scan from typically minus thirty degrees to plus thirty degrees of prism rotation for each half cycle of prism rotation. The image or the signals derived from the image on the image plane just be blanked or remain unused during the remainder of the counter-rotating wedge prism angle of rotation; thereby, reducing the information available at the focal plane by the ratio of blanking time to half cycle rotation time.

SUMMARY OF THE INVENTION

It is a major objective of this invention to provide a linear optical scanner having high optical scan efficiency. Another objective of this invention is to relax the requirement for manufacturing tolerances thereby reducing the cost of production. Another more particular objective of this invention is to minimize the number of parts used in its construction, thereby providing for increased reliability.

These and other objectives of the invention are realized in a linear optical scanner adapted to receive light rays from object space, the light rays passing through the linear optical scanner in image forming relation. The linear optical scanner is adapted to periodically and reciprocally deflect the collimated light rays through a predetermined angle. The periodically and reciprocally deflected collimated light rays leave the linear optical scanner and passing through an objective lens system to an image plane. The objective lens system has an optical axis normal to the image plane and is adapted to focus the periodically and reciprocally deflected collimated light rays to form a periodically and reciprocally displaced image on the image plane. The linear optical scanner comprises: a first and second wedge prism, each wedge prism; having a first surface; an optical axis; and a second surface, the optical axis passing through the first and second surface. The linear optical scanner further comprises a pivot axis parallel to each respective optical axis; means for pivoting each respective wedge prism on the pivot axis; and for positioning each respective optical axis in initial coaxial alignment with the objective lens system optical axis. A means for periodically and reciprocally counter-rotating each respective wedge prism through a predetermined angle on the pivot axis is also included, the wedge prisms having prescriptions adapted to produce reciprocal linear and lateral displacement of the collimated light rays; whereby, the linear optical scanner and the objective lens cooperate to produce a focused image on the focal plane. The focused image is periodically, reciprocally and laterally displaced on the focal plane.

In another alternative embodiment of the foregoing, each respective wedge prism first and second surface is an optically flat plane. Each respective first and second surface, on being extended, intersects to form a wedge angle along a reference edge. For the purpose of characterizing the alignment of each wedge prism, each respective wedge prism is defined as having a respective prism pivot reference extending from a point on the reference edge and pointing with a positive sense in a direction selected to pass through the optical axis. The means for pivoting each respective wedge prism is adapted to align the first and second wedge prism, to have an initial position of rotatable alignment on the pivot axis.

In yet another alternative embodiment, the means for pivoting each respective prism is further adapted to provide an initial position of rotatable alignment; the respective pivot references being pointed in opposing directions.

In another yet even more particular alternative embodiment, the means for periodically and reciprocally counter rotating each respective wedge prism through a predetermined angle is further adapted to counter-rotate each respective wedge prism on the wedge prism pivot axis from the initial position of rotatable alignment, i.e., with their respective pivot references pointing in opposing directions, through alternating positive and negative reciprocal cycles of angular displacement, returning the wedge prisms to a position of rotatable alignment on the pivot axis.

DESCRIPTION OF THE DRAWINGS

The invention will be further described as to an illustrative embodiment thereof in conjunction with the attached drawings in which.

DESCRIPTION OF THE PREFERRED EMBODIMENT

Figure 3:
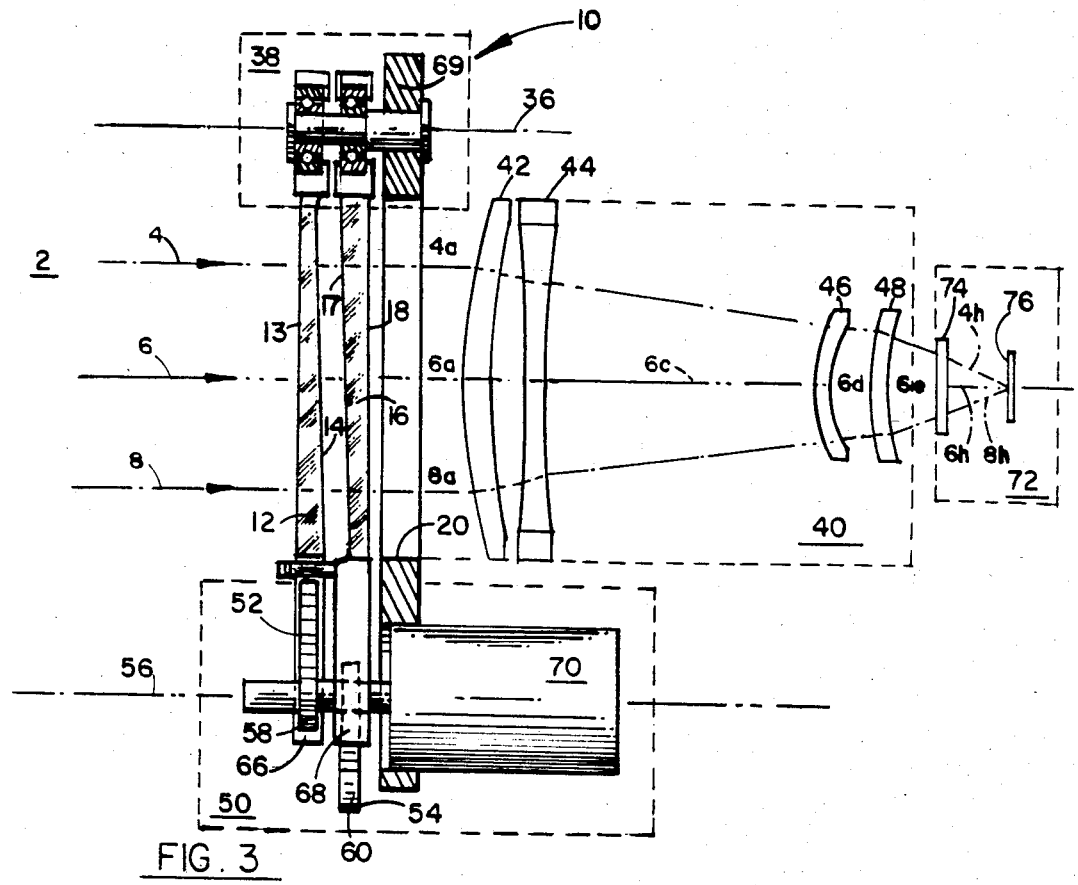
FIG. 3 is a side sectional view of the linear optical scanner coupled to a four element objective lens system and a dewar.

FIG. 3 shows the invention linear optical scanner 10 adapted to receive light rays 4, 6, and 8 from object space 2, the light rays passing through the linear optical scanner 10 in image forming relation, i.e., the rays being conditioned to form an image on an image plane, such as 76 by an objective lens system such as the four element objective lens system 40. Mounting plate 69 is depicted holding the wedge prism pivot axis 36 in fixed relation with the cam pivot axis 56 and also motor 70. This mounting plate 69 provides window 20 through which light rays pass to objective lens system 40. The linear optical scanner 10 is adapted to periodically and reciprocally deflect the collimated light rays through a predetermined angle (not shown). The periodically and reciprocally deflected collimated light rays 4a, 6a, 8a leave the linear optical scanner 10 and pass through the objective lens system 40 illustrated as having lens elements 42, 44, 46, and 48 to form an image on image plane 76 contained in dewar 72. The objective lens system 40 has an optical axis such as 6a, 6c, 6d, 6e that is substantially normal to the image plane 76. The objective lens system 40 is adapted to focus the periodically and reciprocally deflected collimated light rays such as 4h, 6h, 8h to form a periodically and reciprocally displaced image on the image plane 76 through dewar window 74.

The linear optical scanner of FIG. 3 has a first and second wedge prism 12, 16. Each wedge prism has a first surface 13, 17 and a second surface 14, 18. The optical axis of each wedge prism passes through each respective wedge prism first and second surface near ray 6, 6a . . . and is shown as references 25, 26 on FIG. 2.

Referring again to FIG. 3, the pivot axis 36 is depicted as being essentially parallel to each respective optical axis 6, 6a . . . ; however, the effect of Narcissus is reduced substantially by titling the optical axes (not shown) of the wedge prism lenses in relation to the optical axis 6, 6a . . . . The optical axis for each wedge prism is tilted in relation to the optical axis of the objective lens system and the image plane by slightly offsetting the angle between pivot axis 36 and optical axis 6, 6a . . . 6h.

A means for pivoting each respective wedge prism 12, 16 on the pivot axis 36, and for positioning each respective wedge prism optical axis in near coaxial alignment with the objective lens system optical axis 6b, 6c, 6h is represented schematically by function block 38.

A means for periodically and reciprocally counter-rotating each respective wedge prism through a predetermined angle on the pivot axis 36 is represented schematically by function block 50. The wedge prisms 12, 16 have prescriptions adapted to produce reciprocal lateral displacement of the collimated light rays. By "reciprocal" is meant that the point of incidence of a light ray on the image plane is translated laterally on the image plane through equal and opposite distances on the image plane for equal and opposite counter-rotating angles. In this manner, the linear optical scanner 10 and the objective lens 40 cooperate to produce a focused image (not shown) on the image plane 76. The focused image is periodically, reciprocally and laterally displaced along a line normal to the plane of the drawing of FIG. 3 on the focal plane 76.

Figure 4A:
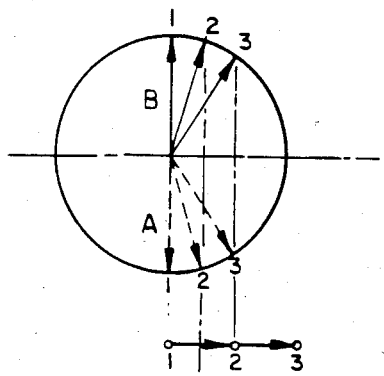
FIG. 4a is a schematic drawing illustrating the sum of Vectors A and B, where these vectors represent the magnitude and angle of displacement of a light ray passing through two wedge prisms.

Each respective wedge prism first and second surface 13, 17 and 14, 18 is an optically flat plane. Referring to FIG. 4a each respective first and second surface, on being extended as represented by phantom lines 13a, 14a, 17a and 18a. meet along the reference edges 21 forming angle $\theta$. The wedge angle $\theta$ selected for use in the preferred embodiment of FIGS. 1, 2 and 3 and is approximately two degrees and in practice is the same for both wedge prisms 12, 16. However, the invention anticipates that an optimal wedge angle will depend on the particular application, the spectrum of interest, the materials and the structure.

Figure 1:
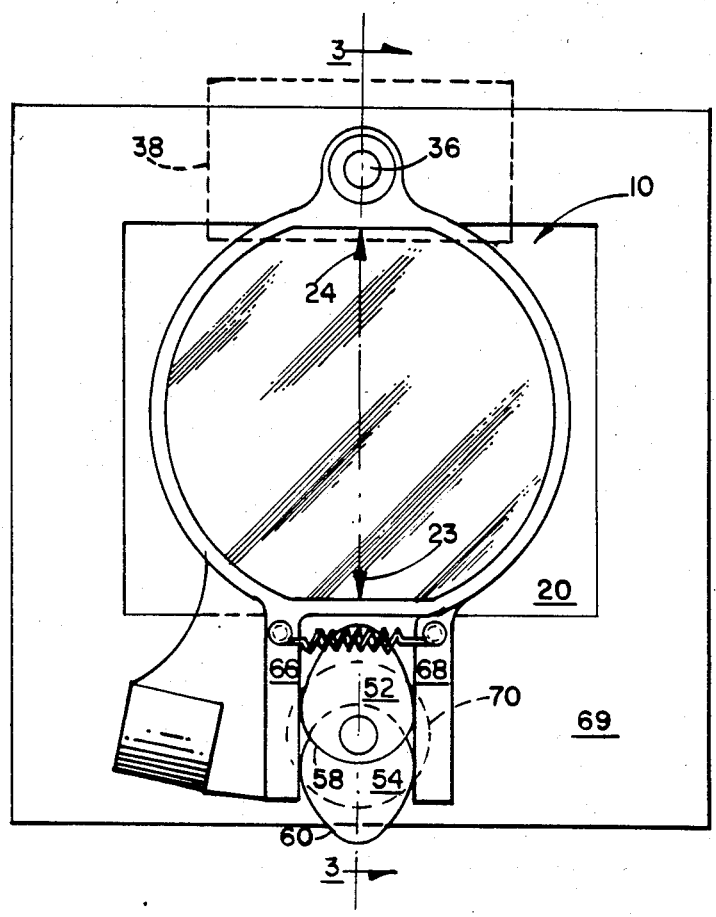
FIG. 1 is a front elevation view of the linear optical scanner with wedge prisms coaxially aligned.
Figure 2:
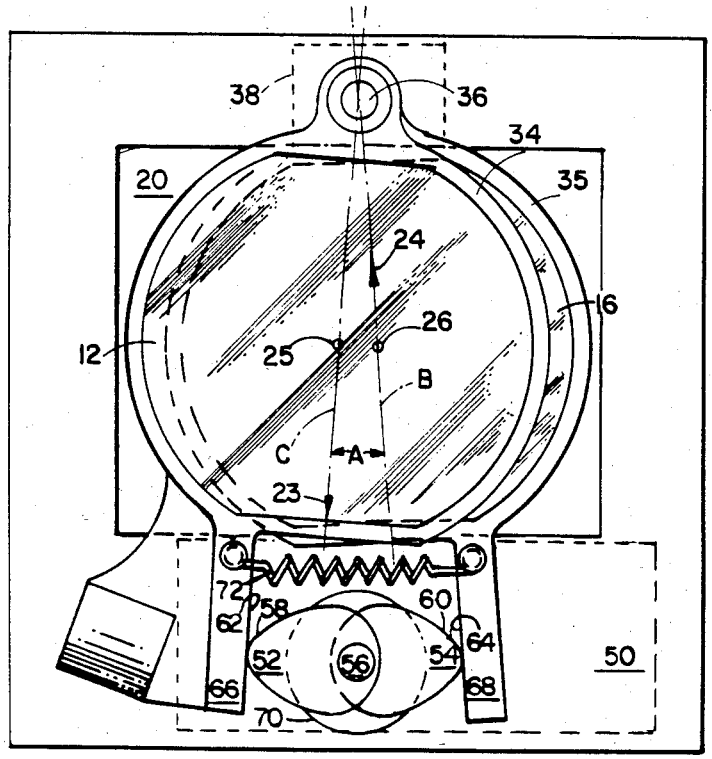
FIG. 2 is a front elevation of the linear optical scanner with wedge prisms pivoted through a first maximum pivot angle.

Referring to FIG. 2, each respective wedge prism 12, 16 has a respective prism pivot reference 23, 24, extending from a point on the reference edge (not shown) and pointing with a positive sense in a direction selected to pass through the respective wedge prism optical axis 25, 26. The means for pivoting each respective wedge prism 38 is adapted to align the first and second wedge prism to have an initial position of rotatable alignment as shown in FIG. 1 by rotating the wedge prism on the pivot axis 36. The respective prism pivot references 23, 24 are parallel when the wedge prisms are in their initial position of rotatable alignment.

Referring to FIG. 3, the pivot axis 36 of each wedge prism is intentionally set at a small angle (not shown), such as one half the field of view angle in relation to that of the objective lens axis 6a, 6c, etc. to minimize the effect of narcissus, i.e., the ability of the image plane to see or view the reflection of itself from the surface of the wedge prisms.

In the preferred embodiment of FIG. 1, the means for pivoting each respective prism 38 is further adapted to provide an initial position of rotatable alignment wherein the respective pivot references 23, 24 are pointed in opposing directions, i.e., they are initially 180 degrees out of phase.

The means for periodically and reciprocally counter rotating each respective wedge prism through a predetermined angle is schematically represented by block 50 in FIGS. 2 and 3. This means for function is further adapted to counter-rotate each respective wedge prism 12, 16 on the pivot axis 36 from the initial position of rotatable alignment, such as is illustrated by pivot references 23 and 24 in FIG. 1 through alternating positive and negative reciprocal cycles of angular displacements as depicted by pivot references 23 and 24 in FIG. 2 returning the wedge prisms to a position of rotatable alignment as shown by the pivot references 23 and 24 in FIG. 1 on the pivot axis 36 after each displacement.

Referring to FIG. 2, the means 50 for periodically and reciprocally counter-rotating each respective wedge prism through a predetermined angle such as "A" on the pivot axis 36 is further adapted to control the rotational velocity of each wedge prism 12, 16. The rotational velocity is controlled to periodically and reciprocally move the image between a first image limit position (not shown) and a second image limit position (not shown). The rotational velocity is further controlled to move the image on the image plane 76 linearly and with relatively constant velocity on the image plane 76 excepting movement near but past the first and second image limit positions designated in FIG. 2 by respective wedge prism pivot references 23, 24 reaching limit positions "C" and "B".

As shown in FIG. 2, the means for pivoting each respective wedge prism 12, 16 on pivot axis 36 is further adapted to have a first and second wedge prism holding frame 34, 35. Each wedge prism holding frame is adapted to hold a respective wedge prism 12, 16. Each respective wedge prism holding frame 34, 35 is further adapted to pivot on the pivot axis 36. This permits rotation of each respective prism reference 23, 24 around the pivot axis 36.

The means 50 for periodically and reciprocally counter-rotating each respective wedge prism through a predetermined angle, such as angle "A", depicted in FIG. 2, on the pivot axis 36 comprises: at least one cam such as cams 52 and 54 having a cam surface such as 58 and 60. These cams pivot on a cam pivot axis 56 shown in FIG. 3 to be relatively parallel with the wedge prism pivot axis 36.

The wedge prism holding frame comprises a cam follower, such as the wedge prism holding frame extensions 66, 68 for engagement with the cam surface such as 58, 60. The cam follower 66, 68 provides cam follower surfaces 62, 64 on which cam surfaces 58, 60 slide in constant contact.

Rotation of the cams 52, 54 on cam pivot axis 56 provides periodic horizontal displacement of the cam surface 58, 60 with respect to the cam pivot axis. The cam surfaces 58, 60 engage the cam followers 66, 68 on their respective cam follower surfaces 62, 64. Each respective cam follower 66, 68 is thereby displaced in relation to the cam pivot axis 56 thereby rotating each respective wedge prism holding frame 34, 35 on the wedge prism pivot axis 36.

In the preferred embodiment of FIGS. 1, 2, and 3, each respective cam surfaces 58, 60 is shaped to produce a reciprocal displacement of each respective cam follower 66, 68 the displacement being transverse with respect to the cam pivot axis 56. Rotation of each wedge prism holding frame 34, 35 thereby achieves rotation of each respective prism pivot reference 23, 24. Each respective prism pivot reference 23, 24 is periodically and reciprocally counter-rotated on the pivot axis 36 through equivalent and reciprocal angular displacements.

Referring to FIG. 2, the prism pivot references 23, 24 are illustrated as oscillating or reciprocating through an angle of ±"A" units of rotation. In a particular version of the preferred embodiment, the ±"A" displacement was limited to ±6 degrees. The cam surfaces are adapted to control each respective wedge prism reference angular velocity to move the image on the focal plane linearly and with relatively constant velocity on the image plane excepting movement near the first and second image limit positions shown as position B and C respectively.

The means for periodically and reciprocally counter-rotating each respective wedge prism through predetermined angles on the pivot axis includes a return spring 72. The return spring 72 is coupled between the first and second wedge prism cam followers 66, 68. The return spring 72 is adapted to hold each respective wedge prism holding frame cam follower surfaces 62, 64 in constant engagement with each respective cam surface 58, 60. Other methods for retaining the wedge prism follower in contact with the cam follower surfaces that are anticipated include magnetic means in which magnetic means are selected to hold the respective cam followers 66, 68 in contact with respective cams 52, 54. Another method that is anticipated and which is practiced in the preferred embodiment includes a means by which a follower pin (not shown) is inserted into a cam race or groove cut into a surface of the cam to describe the required cam travel of the follower while preventing the cam follower surfaces 62, 64 from leaving the cam surfaces 58 and 60.

The means for periodically and reciprocally counter-rotating each respective wedge prism 12, 16 through a predetermined angle such as "A" on the pivot axis 36 also includes a motor means 70 as depicted in FIG. 3. The motor 70 rotates the first and second cam 52, 54 on the cam pivot axis 56. Referring to FIG. 2, each respective cam surface 58, 60 periodically and reciprocally displaces a respective wedge prism holding frame cam follower 66, 68 to counter-rotate each respective wedge prism holding frame 34, 35 on the pivot axis 36 through reciprocal angular displacements of ±"A" degrees.

FIG. 4a illustrates the sum of vectors A and B as each of these respective vectors rotate through each of three discrete angular positions. Vectors A and B are intended to figuratively represent the magnitude and direction of the deflection of a light ray passing through each of two opposed wedge prisms as the respective wedge prisms are counter-rotated through each of three corresponding angular positions. Note that vectors A and B are equal in magnitude in each of the three positions. The sum of vectors A and B appear as a horizontal vector at points 1, 2 and 3 immediately below the circle.

When the wedge prisms are directly opposed at angular position 1, the vector sum is zero at point 1 on the horizontal vector.

As the wedge prisms counter-rotate with the same angular velocity to angular position 2, vector sum of A and B displaces the ray to horizontal point 2. Again, as the wedges continue to counter-rotate to the angular position 3, the vector sum displaces the ray to the point 3. The change in ray position is linear with time up to this point. At point 3, the linear scan has reached its limit and each wedge angular direction begins to reverse. The turn around period is minimized by conventional cam design techniques.

Figure 4B:
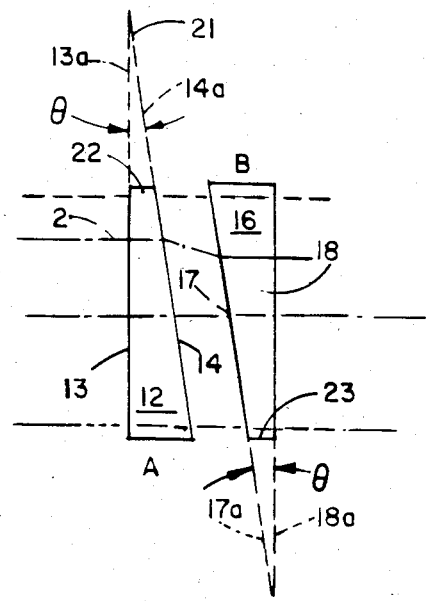
FIG. 4b illustrates schematically a light ray passing through two opposing wedge prisms.

FIG. 4b shows the deflection of a light ray passing through the first and second wedge prisms 12, 16. As the wedge prisms 12 and 16 are counter-rotated through discrete angle positions 1, 2 and 3, the vertical component of vectors A and B cancel while the horizontal components of vectors A and B add as depicted above in FIG. 4a.

The concept of "reciprocal lateral displacement of the collimated light rays" is meant to include the notion of consecutive equal and opposite movement of incidence of light rays forming an image on an image plane in response to successive equal and opposite counter-rotating wedge prism displacement angles.

Accordingly, there has been described a linear optical scanner for scanning an image on an image plane. Although the invention has been disclosed and illustrated in detail, it is to be clearly understood that the same is by way of illustration and example only and is not be be taken by way of limitation, the spirit and scope of this invention being limited only by the terms of the appended claims.

What is claimed is:

1. A linear optical scanner adapted to receive light rays from object space, said light rays passing through said linear optical scanner in image forming relation, said linear optical scanner being adapted to periodically and reciprocally deflect said collimated light rays through a predetermined angle, said periodically and reciprocally deflected collimated light rays leaving said linear optical scanner and passing through an objective lens system to an image plane, said objective lens system having an optical axis incident on said image plane and being adapted to focus said periodically and reciprocally deflected collimated light rays to form a periodically and reciprocally displaced image on said image plane, said linear optical scanner comprising:
   a first and second wedge prism, each wedge prism having:
      a first surface,
      an optical axis, and
      a second surface, each respective optical axis passing through a respective first and second surface,
   a pivot axis,
   means for pivoting each respective wedge prism on a respective pivot axis and for positioning each respective wedge prism optical axis to direct said collimated light rays passing through said linear optical scanner to said objective lens system, and
   means for periodically and reciprocally counter-rotating each respective wedge prism through a predetermined angle on each respective pivot axis, said wedge prisms having prescriptions adapted to produce reciprocal lateral displacement of said collimated light rays;
   whereby, said linear optical scanner and said objective lens cooperate to produce a focused image on said focal plane, said focused image being periodically, reciprocally and laterally displaced on said focal plane.

2. The combination of claim 1, wherein each respective wedge prism first and second surface is an optically flat plane, each respective first and second surface, on being extended, intersecting to form a wedge angle along a reference edge,
   each respective wedge prism having a respective prism pivot reference as extending from a point on said reference edge and pointing with a positive sense in a direction selected to pass through said optical axis, and wherein said means for pivoting each respective wedge prism is adapted to align said first and second wedge prism, to have an initial position of rotatable alignment on said pivot axis, wherein said respective pivot references are parallel.

3. The combination of claim 2, wherein said means for pivoting each respective prism is further adapted to provide an initial position of rotatable alignment wherein said respective pivot references are pointed in opposing directions and wherein each respective pivot axis is coaxially aligned.

4. The combination of claim 3, wherein said pivot axis is positioned to establish a small angle between each respective wedge prism optical axis and said objective lens system optical axis;
   whereby the effect of narcissus is minimized.

5. The combination of claim 4, wherein said means for periodically and reciprocally counter rotating each respective wedge prism through a predetermined angle is further adapted to counter-rotate each respective wedge prism on said pivot axis from said initial position of rotatable alignment through alternating positive and negative reciprocal cycles of angular displacements returning said wedge prisms to a position of rotatable alignment on said pivot axis.

6. The combination of claim 1, wherein said means for periodically and reciprocally counter-rotating each respective wedge prism through a predetermined angle on said pivot axis is further adapted to establish the rotational velocity of each wedge prism, said rotational velocity being controlled to periodically and reciprocally move said image between a first image limit position and a second image limit position, said rotational velocity being further controlled to move said image on said focal plane linearly and with relatively constant velocity on said image plane excepting movement near said first and second image limit positions.

7. The combination of claim 4, wherein said means for periodically and reciprocally counter-rotating each respective wedge prism through a predetermined angle on said pivot axis is further adapted to establish the rotational velocity of each wedge prism pivot reference, said rotational velocity being controlled to periodically and reciprocally move said image between a first image limit position and a second image limit position, said rotational velocity being further controlled to move said image linearly and with relatively constant velocity on said image plane excepting movement near said first and second image limit positions.

8. The combination of claim 7, wherein said means for pivoting each respective wedge prism on a pivot axis is further adapted to have a first and second wedge prism holding frame, each wedge prism holding frame being adapted to hold a respective wedge prism, each respective wedge prism holding frame being adapted to pivot on said pivot axis;
   thereby permitting rotation of each respective prism reference around said pivot axis.

9. The combination of claim 8, wherein said means for periodically and reciprocally counter-rotating each respective wedge prism through a predetermined angle on said pivot axis further comprises:
   at least one cam having a cam surface,
   a cam pivot axis, said cam rotating on said cam pivot axis,
   said wedge prism holding frame further comprising a cam follower for engagement with said cam surface,
   rotation of said cam on said cam pivot axis providing horizontal displacement of said cam surface with respect to said cam pivot axis;

whereby, said cam surface being engaged with said cam follower displaces each respective cam follower with respect to said cam pivot axis thereby rotating each respective wedge prism holding frame on said wedge prism pivot axis.

10. The combination of claim 9, wherein said means for periodically and reciprocally counter-rotating each respective wedge prism through a predetermined angle further comprises:
   a first and second cam, each respective cam having a respective cam surface and rotating on said cam pivot axis,
   each respective wedge prism holding frame cam follower being engaged with a respective cam surface,
   each respective cam surface being shaped to produce a reciprocal displacement of each respective cam follower, said displacement being transverse with respect to said cam pivot axis; whereby, each respective prism pivot reference is periodically and reciprocally counter-rotated on said pivot axis through equivalent and reciprocal angular displacements, said cam surfaces being adapted to control each respective wedge prism reference angular velocity to move the image on the focal plane linearly and with relatively constant velocity on said image plane excepting movement near said first and second image limit positions.

11. The combination of claim 10, wherein said means for periodically and reciprocally counter-rotating each respective wedge prism through a predetermined angle on said pivot axis further comprises:
   a return spring, said return spring being coupled between said first and second wedge prism holding frame, said spring being adapted to hold each respective wedge prism holding frame cam follower in constant engagement with each respective cam surface.

12. The combination of claim 11, wherein said means for periodically and reciprocally counter-rotating each respective wedge prism through a predetermined angle on said pivot axis further comprises: a motor means for rotating said first and second cam on said cam pivot axis;
   whereby each respective cam surface periodically and reciprocally displaces a respective wedge prism holding frame cam follower to counter-rotate each respective wedge prism holding frame on said pivot axis through reciprocal angular displacements.

13. The combination of claim 1, wherein each respective wedge prism first and second surface is an optically flat plane, each respective first and second surface, on being extended, intersecting to form a wedge angle along a reference edge,
   each respective wedge prism having a respective prism pivot reference as extending orthogonally from a point on said reference edge and pointing with a positive sense in a direction selected to pass through said optical axis, and wherein said means for pivoting each respective wedge prism is adapted to align said first and second wedge prism, to have an initial position of rotatable alignment on said pivot axis with said respective pivot references being parallel.

14. The combination of claim 13, wherein said means for pivoting each respective prism is further adapted to provide an initial position of rotatable alignment wherein said respective pivot references are pointed in opposing directions and wherein each respective pivot axis is coaxially aligned.

15. The combination of claim 14, wherein said pivot axis is positioned to establish a small angle between each respective prism optical axis and said objective lens system optical axis;
   whereby the effect of narcissus is minimized.

16. The combination of claim 15, wherein said means for periodically and reciprocally counter rotating each respective wedge prism through a predetermined angle is further adapted to counter-rotate each respective wedge prism on said pivot axis from said initial position of rotatable alignment through alternating positive and negative reciprocal cycles of angular displacements returning said wedge prisms to a position of rotatable alignment on said pivot axis.

17. The combination of claim 16, wherein said means for periodically and reciprocally counter-rotating each respective wedge prism through a predetermined angle on said pivot axis is further adapted to establish the rotational velocity of each wedge prism pivot reference, said rotational velocity being controlled to periodically and reciprocally move said image beween a first image limit position and a second image limit position, said rotational velocity being further controlled to move said image linearly and with relatively constant velocity on said image plane excepting movement near said first and second image limit positions.

18. The combinatinon of claim 17, wherein said means for pivoting each respective wedge prism on a pivot axis is further adapted to have a first and second wedge prism holding frame, each wedge prism holding frame being adapted to hold a respective wedge prism, each respective wedge prism holding frame being adapted to pivot on said pivot axis;
   thereby permitting rotation of each respective prism reference around said pivot axis.

19. The combination of claim 18, wherein said means for periodically and reciprocally counter-rotating each respective wedge prism through a predetermined angle on said pivot axis further comprises:
   at least one cam having a cam surface,
   a cam pivot axis parallel with said pivot axis, said cam rotating on said cam pivot axis,
   said wedge prism holding frame further comprising a cam follower means for engagement with said cam surface,
   rotation of said cam pivot axis providing eccentric displacement of said cam surface with respect to said cam pivot axis;
   whereby, said cam surface being engaged with said cam follower displaces each respective cam follower with respect to said cam pivot axis thereby rotating each respective wedge prism holding frame on said pivot axis.

20. The combination of claim 19, wherein said means for periodically and reciprocally counter-rotating each respective wedge prism through a predetermined angle further comprises:
   a first and second cam, each respective cam having a respective cam surface and rotating on said cam pivot axis,
   each respective wedge prism holding frame cam follower being engaged with a respective cam surface,
   each respective cam surface being shaped to produce a reciprocal displacement of each respective cam follower, said displacement being transverse with respect to said cam pivot axis; whereby, each respective wedge prism pivot reference is periodically and reciprocally counter-rotated on said pivot axis through equivalent and reciprocal angular displacements, said cam surfaces being adapted to control each respective prism reference angular velocity to move the image on the focal plane linearly and with relatively constant velocity on said image plane excepting movement near said first and second image limit positions.

21. The combination of claim 20, wherein said means for periodically and reciprocally counter-rotating each respective wedge prism through a predetermined angle on said pivot axis further comprises:
a return spring, said return spring being coupled between said first and second second wedge prism holding frame, said spring being adapted to hold each respective wedge prism holding frame cam follower in constant engagement with each respective cam surface.

22. The combination of claim 21, wherein said means for periodically and reciprocally counter-rotating each respective wedge prism through a predetermined angle on said pivot axis further comprises: a motor means for rotating said first and second cam on said cam pivot axis;
whereby each respective cam surface periodically and reciprocally displaces a respective wedge prism holding frame cam follower to counter-rotate each respective wedge prism holding frame on said pivot axis through reciprocal angular displacements.

23. A linear optical scanner adapted to receive light rays from object space, said light rays passing through said linear optical scanner in image forming relation, said linear optical scanner being adapted to periodically and reciprocally deflect said light rays through a predetermined angle, said periodically and reciprocally deflected collimated light rays leaving said linear optical scanner and passing through an objective lens system to form an image on an image plane, said objective lens system having an optical axis incident on said image plane and adapted to focus said periodically and reciprocally deflected collimated light rays to form a periodically and reciprocally displaced image on said image plane, said linear optical scanner comprising:
a first and second wedge prism, each wedge prism having:
a first surface,
an optical axis, and
a second surface, each respective optical axis passing through a respective first and second surface,
a pivot axis,
means for pivoting each respective wedge prism on a respective pivot axis and for positioning each respective wedge prism optical axis to direct said collimated light rays passing through said linear optical scanner to said objective lens system, and
means for periodically and reciprocally counter-rotating each respective wedge prism through a predetermined angle on said pivot axis, said wedge prisms having prescriptions adapted to produce reciprocal lateral displacement of said light rays;
whereby, said linear optical scanner and said objective lens cooperate to produce a focused image on said focal plane, said focused image being periodically, reciprocally and laterally displaced on said image plane.

24. The combination of claim 23, wherein each respective wedge prism first and second surface is an optically flat plane, each respective first and second surface, on being extended, intersecting to form a wedge angle along a reference edge,
each respective wedge prism having a respective prism pivot reference as extending orthogonally from a point on said reference edge and pointing with a positive sense in a direction selected to bisect said wedge angle, each pivot reference passing through said optical axis, and wherein said means for pivoting each respective wedge prism is adapted to align said first and second wedge prism, to have an initial position of rotatable alignment on said pivot axis, wherein said respective pivot references are parallel.

* * * * *